(12) United States Patent  (10) Patent No.: US 8,446,392 B2
Wang et al.  (45) Date of Patent: May 21, 2013

(54) METHOD FOR DETERMINING THE LOCATION OF A POINTER IN A POINTER INPUT REGION, AND INTERACTIVE INPUT SYSTEM EXECUTING THE METHOD

(75) Inventors: Yunqiu (Rachel) Wang, Calgary (CA); Grant McGibney, Calgary (CA); Gerald Morrison, Calgary (CA)

(73) Assignee: SMART Technologies ULC, Calgary, Alberta (CA)

( * ) Notice: Subject to any disclaimer, the term of this patent is extended or adjusted under 35 U.S.C. 154(b) by 649 days.

(21) Appl. No.: 12/619,173

(22) Filed: Nov. 16, 2009

(65) Prior Publication Data

US 2011/0115746 A1   May 19, 2011

(51) Int. Cl.
*G06F 3/042* (2006.01)
(52) U.S. Cl.
USPC .......................................................... 345/175
(58) Field of Classification Search
None
See application file for complete search history.

(56) References Cited

U.S. PATENT DOCUMENTS

| | | | |
|---|---|---|---|
| 5,317,140 A | 5/1994 | Dunthorn | |
| 5,448,263 A | 9/1995 | Martin | |
| 6,141,000 A | 10/2000 | Martin | |
| 6,337,681 B1 | 1/2002 | Martin | |
| 6,747,636 B2 | 6/2004 | Martin | |
| 6,803,906 B1 | 10/2004 | Morrison et al. | |
| 7,009,663 B2 | 3/2006 | Abileah et al. | |
| 7,023,503 B2 | 4/2006 | den Boer | |
| 7,053,967 B2 | 5/2006 | Abileah et al. | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,408,598 B2 | 8/2008 | den Boer et al. | |
| 7,443,387 B2 * | 10/2008 | Tanaka et al. | 345/173 |
| 2005/0285985 A1 | 12/2005 | Boer et al. | |
| 2006/0125971 A1 | 6/2006 | Abileah et al. | |
| 2007/0279346 A1 | 12/2007 | den Boer et al. | |
| 2008/0048995 A1 | 2/2008 | Abileah et al. | |
| 2008/0055295 A1 | 3/2008 | Abileah et al. | |
| 2008/0055499 A1 | 3/2008 | den Boer et al. | |
| 2008/0055507 A1 | 3/2008 | den Boer et al. | |
| 2008/0062156 A1 | 3/2008 | Abileah et al. | |
| 2008/0062157 A1 | 3/2008 | Abileah et al. | |
| 2008/0062343 A1 | 3/2008 | Boer et al. | |
| 2008/0066972 A1 | 3/2008 | Abileah et al. | |
| 2008/0084374 A1 | 4/2008 | Abileah et al. | |
| 2008/0111780 A1 | 5/2008 | Abileah et al. | |
| 2008/0122803 A1 | 5/2008 | Izadi et al. | |
| 2008/0129909 A1 | 6/2008 | den Boer et al. | |

(Continued)

OTHER PUBLICATIONS

Transmittal; Written Opinion of the International Searching Authority; and the International Search Report for International Application No. PCT/CA2010/001580, with a mailing date of Jan. 25, 2011.

*Primary Examiner* — Jason Olson
(74) *Attorney, Agent, or Firm* — Katten Muchin Rosenman, L.L.P.

(57) ABSTRACT

An interactive input system comprises a touch surface, and imaging system associated with the touch surface and processing structure. The imaging system comprises an optical sensor array that spans at least a portion of the area of the touch surface, and the processing structure communicates with the imaging system and analyzes images received by the imaging system to determine whether at least one pointer is near to the touch surface and the location of the at least one pointer in respect of the touch surface based at least in part on the edge sharpness of the at least one pointer.

24 Claims, 18 Drawing Sheets

U.S. PATENT DOCUMENTS

| | | |
|---|---|---|
| 2008/0129913 A1 | 6/2008 | den Boer et al. |
| 2008/0129914 A1 | 6/2008 | de Boer et al. |
| 2009/0219256 A1* | 9/2009 | Newton ................... 345/173 |
| 2009/0278816 A1* | 11/2009 | Colson ................... 345/175 |
| 2010/0053348 A1* | 3/2010 | Yoshimoto et al. ........ 348/218.1 |
| 2010/0201637 A1* | 8/2010 | Herne et al. ................ 345/173 |

* cited by examiner

METHOD FOR DETERMINING THE LOCATION OF A POINTER IN A POINTER INPUT REGION, AND INTERACTIVE INPUT SYSTEM EXECUTING THE METHOD

FIELD OF THE INVENTION

The present invention relates generally to interactive input systems and in particular to a method for determining the location of a pointer in a pointer input region, and an interactive input system executing the method.

BACKGROUND OF THE INVENTION

Interactive input systems that allow users to inject input (i.e. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

U.S. Pat. No. 7,009,663 to Abileah et al. discloses a machine vision based interactive input system that includes an Active Matrix Liquid Crystal Display (AMLCD) display panel constructed so as to substitute certain of the display pixels throughout the display panel with a photo-sensitive thin film transistor ("photo TFT"). An array of the photo TFTs together with corresponding select and readout lines cooperate as an imaging system embedded into the LCD backplane. Inhibition of light transmission to certain of the photo TFTs in the array can be detected during voltage readout cycles thereby to detect whether and where the touch surface has been touched.

The embedded imaging system disclosed by Abileah et al. has wide applicability as a platform technology for interactive input systems. However, it will be understood that an interactive input system incorporating such an embedded imaging system will be of limited use for providing user input to application programs in a robust manner unless touch events can be reliably distinguished from other causes of changes in the light transmitted to the photo TFTs. For example, the quantity of ambient light may vary, as might the presence of non-pointer objects in the vicinity of the display panel. Furthermore, it would be useful for such an interactive input system to be capable of distinguishing touch events from hover events, so as to determine whether in fact a touch has occurred, and also to extend the pointer input region into three dimensions by including the touch surface and some of the space extending from it.

It is therefore an object of the present invention to provide a method and system for determining the location of a pointer in a pointer input region.

SUMMARY OF THE INVENTION

According to one aspect there is provided an interactive input system comprising:

a touch surface;

an imaging system associated with the touch surface and comprising an optical sensor array that spans at least a portion of the area of the touch surface; and processing structure communicating with the imaging system and analyzing images received by the imaging system to determine whether at least one pointer is near to the touch surface and the location of the at least one pointer in respect of the touch surface based at least in part on the edge sharpness of the at least one pointer.

According to another aspect there is provided an interactive input system comprising:

a pointer input region comprising a touch surface;

an imaging system associated with the touch surface and comprising an optical sensor array that spans at least a portion of the area of the touch surface; and processing structure communicating with the imaging system and analyzing images received by the imaging system to determine whether at least one pointer is within the pointer input region and the location of the at least one pointer in the pointer input region based at least in part on the edge sharpness of the at least one pointer.

According to another aspect, there is provided, in an interactive input system comprising a touch surface, a method of determining the location of at least one pointer in a pointer input region comprising:

receiving images from an optical sensor array that is associated with and spans at least a portion of the area of the touch surface;

analyzing the images to determine whether at least one pointer is within the pointer input region; and in the event that at least one pointer is within the pointer input region, determining the location of the pointer within the pointer input region based at least in part of the edge sharpness of the at least one pointer.

According to another aspect, there is provided a method of determining the location of at least one pointer in a pointer input region of an interactive input system comprising a touch surface, the method comprising:

receiving images from an optical sensor array that is associated with and spans at least a portion of the area of the touch surface;

determining whether at least one pointer is within the pointer input region; and in the event that at least one pointer is within the pointer input region, determining the location of the pointer within the pointer input region based at least in part on the edge sharpness of the at least one pointer.

According to still another aspect, there is provided a method of determining the location of at least one pointer in a pointer input region of an interactive input system comprising a touch surface, the method comprising:

receiving an image from an optical sensor array that is associated with and spans at least a portion of the area of the touch surface; and determining the location of the pointer within the pointer input region based at least in part on the relative position of shadows in the image.

The method and system described herein provide robust touch detection and the ability to provide both touch and hover input to an interactive input system.

BRIEF DESCRIPTION OF THE DRAWINGS

Embodiments will now be described more fully with reference to the accompanying drawings in which.

DETAILED DESCRIPTION OF THE EMBODIMENTS

Figure 1:
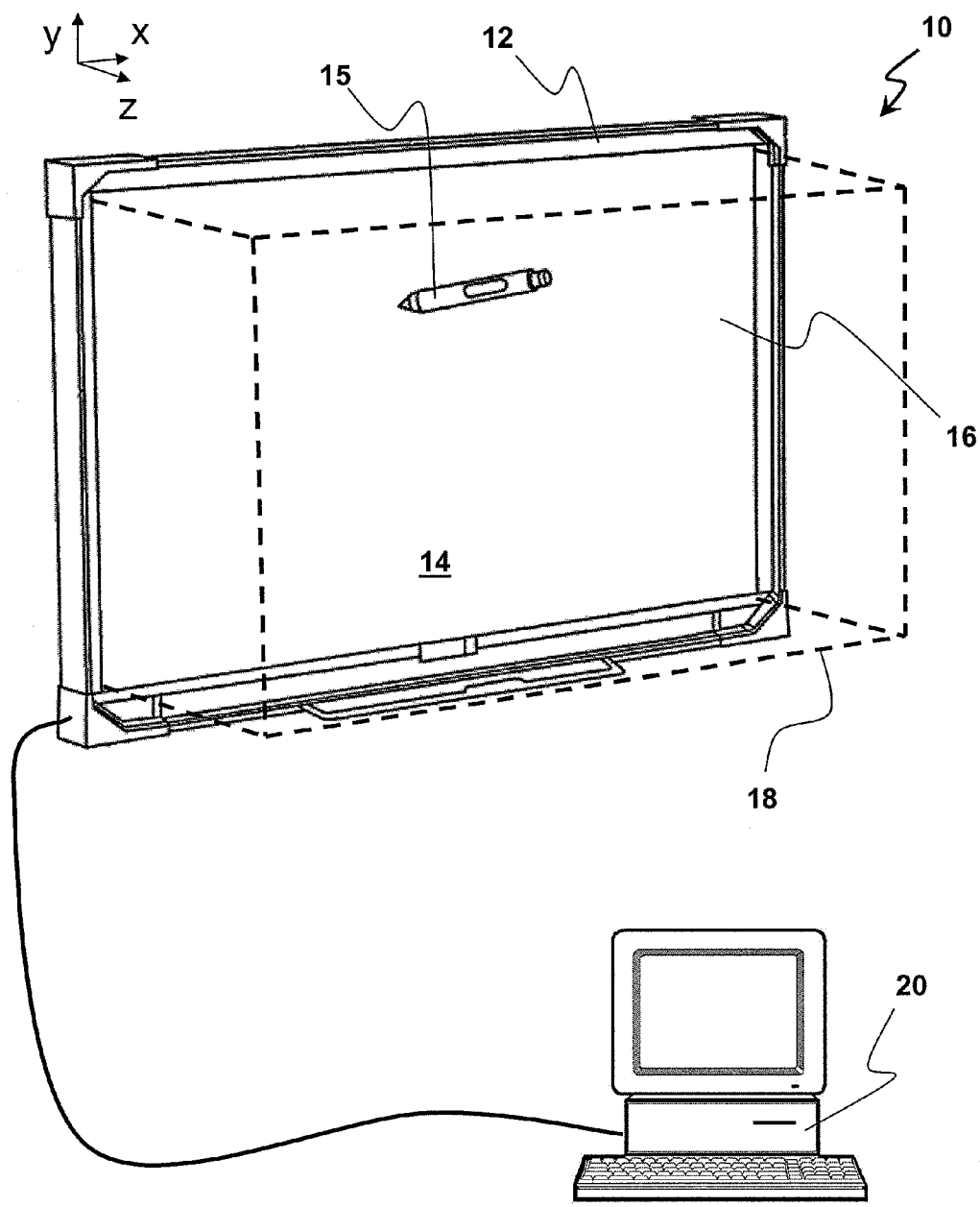
FIG. 1 is a schematic view of an interactive input system according to an embodiment.
Figure 2:
FIGS. 2 through 5 are images including pointers at various distances from the touch surface of an imaging system such as that shown in FIG. 1.

Turning to FIG. 1, a machine-vision based interactive input system is shown and generally identified by reference numeral 10. As can be seen, interactive input system 10 includes a touch panel 12 having a touch surface 14 on which pointer interactions with a pointer 15 may be made, that is connected to a processing structure 20.

The processing structure 20 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

The processing structure 20 runs a host software application/operating system which, during execution, provides a graphical user interface comprising a canvas page or palette. In this embodiment, the graphical user interface is presented on the touch panel 12, such that freeform or handwritten ink objects and other objects can be input and manipulated via pointer interaction with both the touch surface 14 and with the nearby area, collectively the pointer input region 18.

In this embodiment, touch surface 14 is the generally planar surface of an Active Matrix LCD (AMLCD) display device. An imaging system 16 associated with the touch panel 12 includes an optical sensor array (not shown) of photo TFTs that is embedded in and spans the entire touch surface 14. More particularly, the touch panel 12 is similar to an AMLCD display with certain of the display pixels throughout the display area of the AMLCD substituted with photo TFTs that each cause variations in voltage output on readout lines to which they are connected as the amount of light they receive varies. The same AMLCD backplane therefore is capable of both displaying images received from processing structure 20, and acquiring images of the pointer input region 18 for providing to processing structure 20. The received images are processed by processing structure 20 to determine whether a pointer 15 is in fact within a pointer input region 18, and also whether while within the pointer input region 18 the pointer 15 is in contact with the touch surface 14.

Prior to use of interactive input system 10, an initial calibration procedure is performed. During calibration, the imaging system 16 acquires a background image simply by acquiring an image where there is no pointer 15 or other temporary foreign object such as a hand, arm head or body of the user within the pointer input region 18. The background image is received for later use in increasing the signal to noise ratio of images received during operation of the interactive input system 10, as will be described. Also during calibration, the imaging system 16 acquires one or more images of a pointer 15 touching the touch surface 14, and at various z-positions relative to the touch surface 14. The calibration method described above is typically conducted when the interactive input system 10 is being configured. However, the calibration method may be conducted at the user's command, or automatically executed from time to time.

With calibration having been performed, imaging processing during operation of the interactive input system 10 is performed in order to detect the coordinates and characteristics of any pointers 15 in received images. During operation of interactive input system 10, processing structure 20 may output video data to touch screen 12 which, in turn, displays the video data on its display surface during display cycles. Interleaved with the display cycles are readout cycles during which the imaging system 16 reads voltages from the photo TFTs in the optical sensor array, processes the voltages to obtain image pixel values, and provides the resultant received images to processing structure 20.

When each image acquired by imaging system 16 is received, the received image is processed to determine whether a pointer 15 is within the pointer input region 18, and at what location within the pointer input region the pointer 15 is located. It will be understood that, according to the present application, in addition to the x and y coordinates of the pointer 15 in the received image being determined, the z location of the pointer 15 with respect to the touch surface 14 (where a pointer z-location of zero indicates an actual touch) is also determined based on the edge sharpness of the pointer 15.

Figure 3:
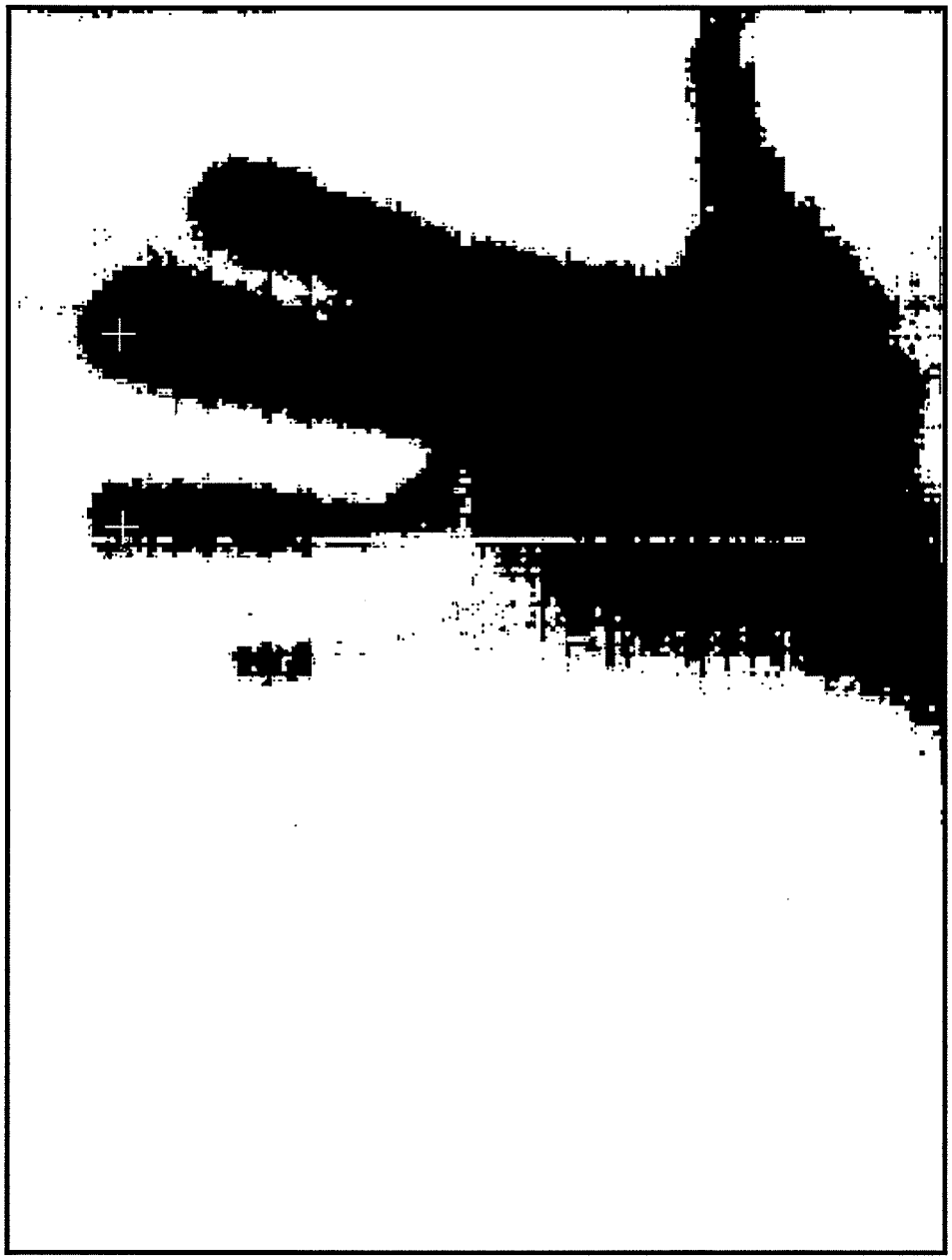
Figure 4:
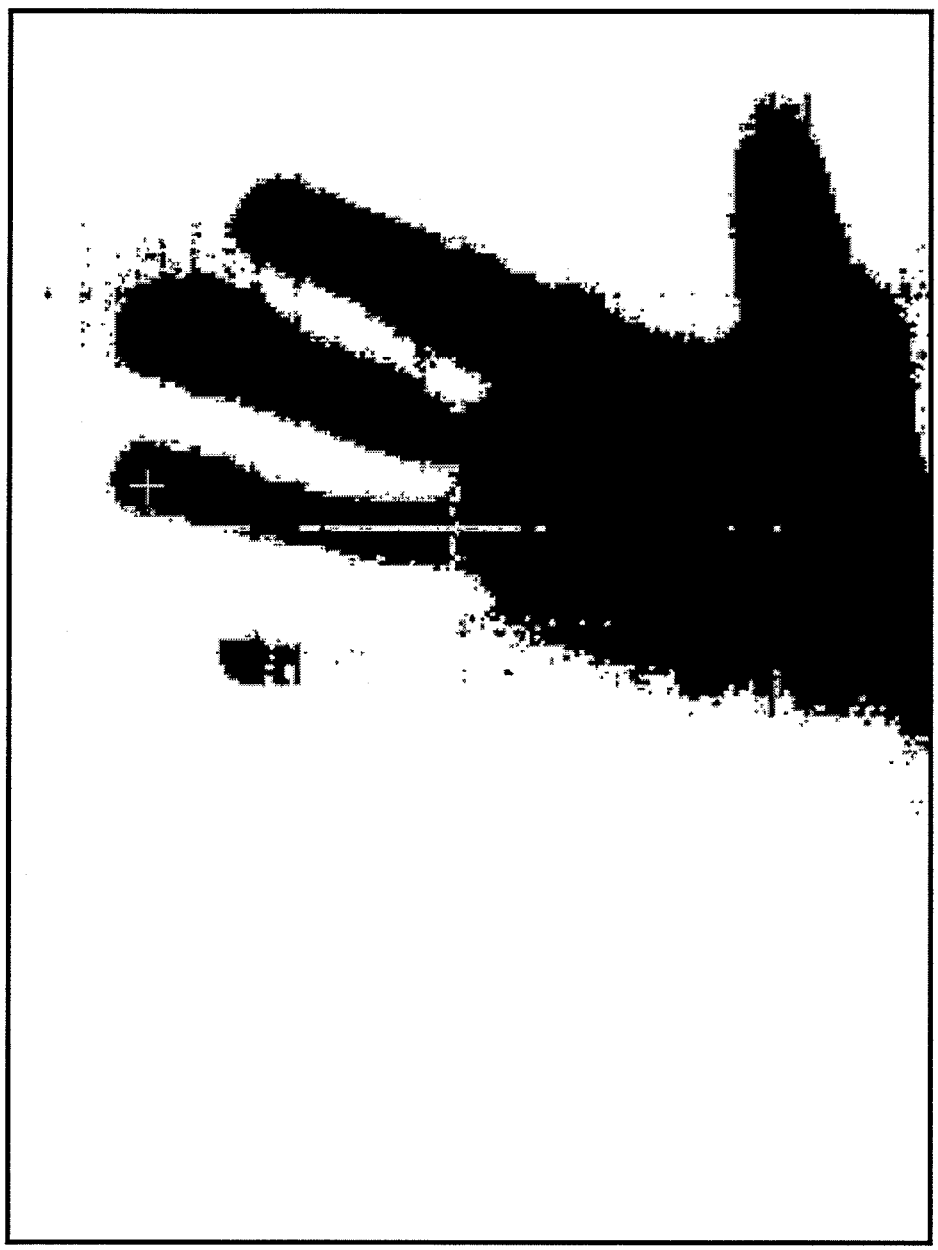
Figure 5:
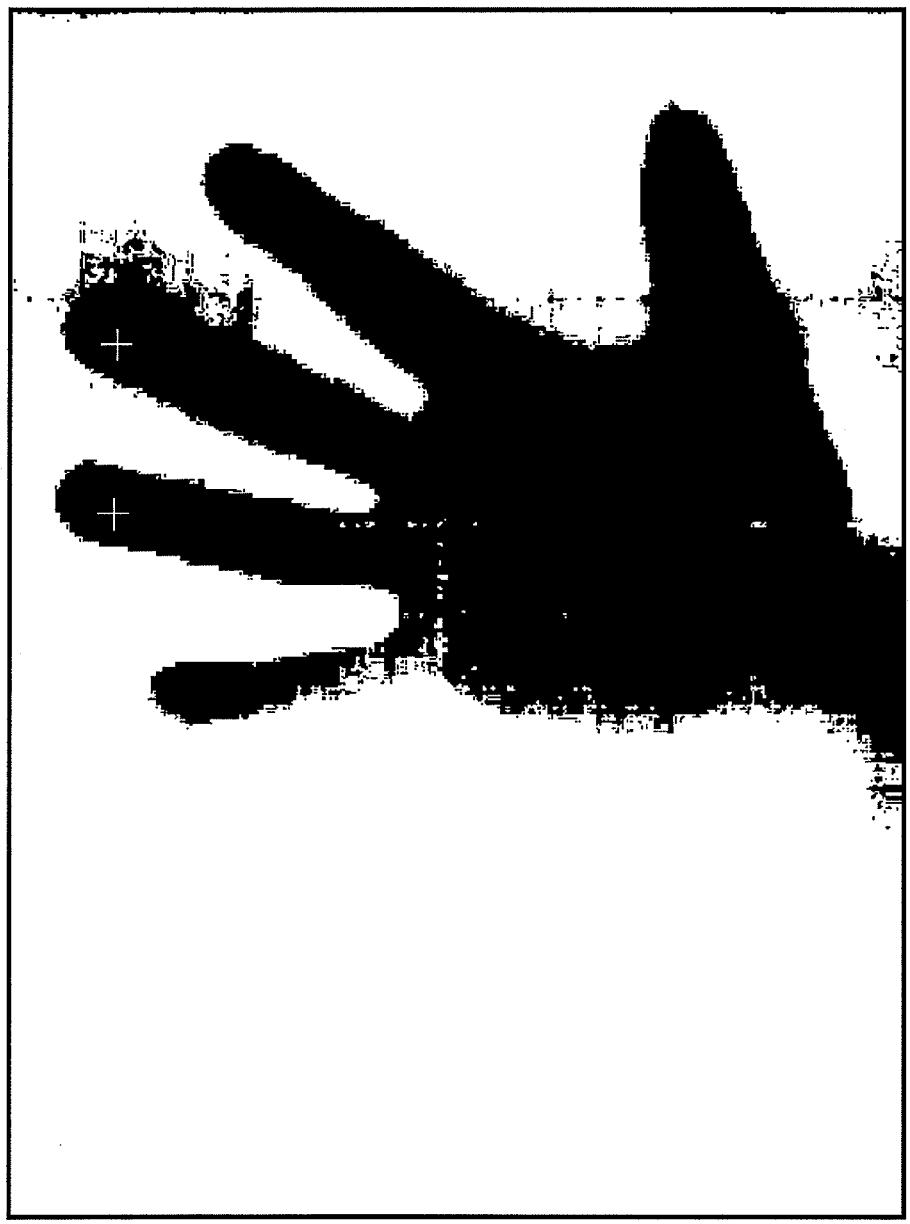
Figure 6:
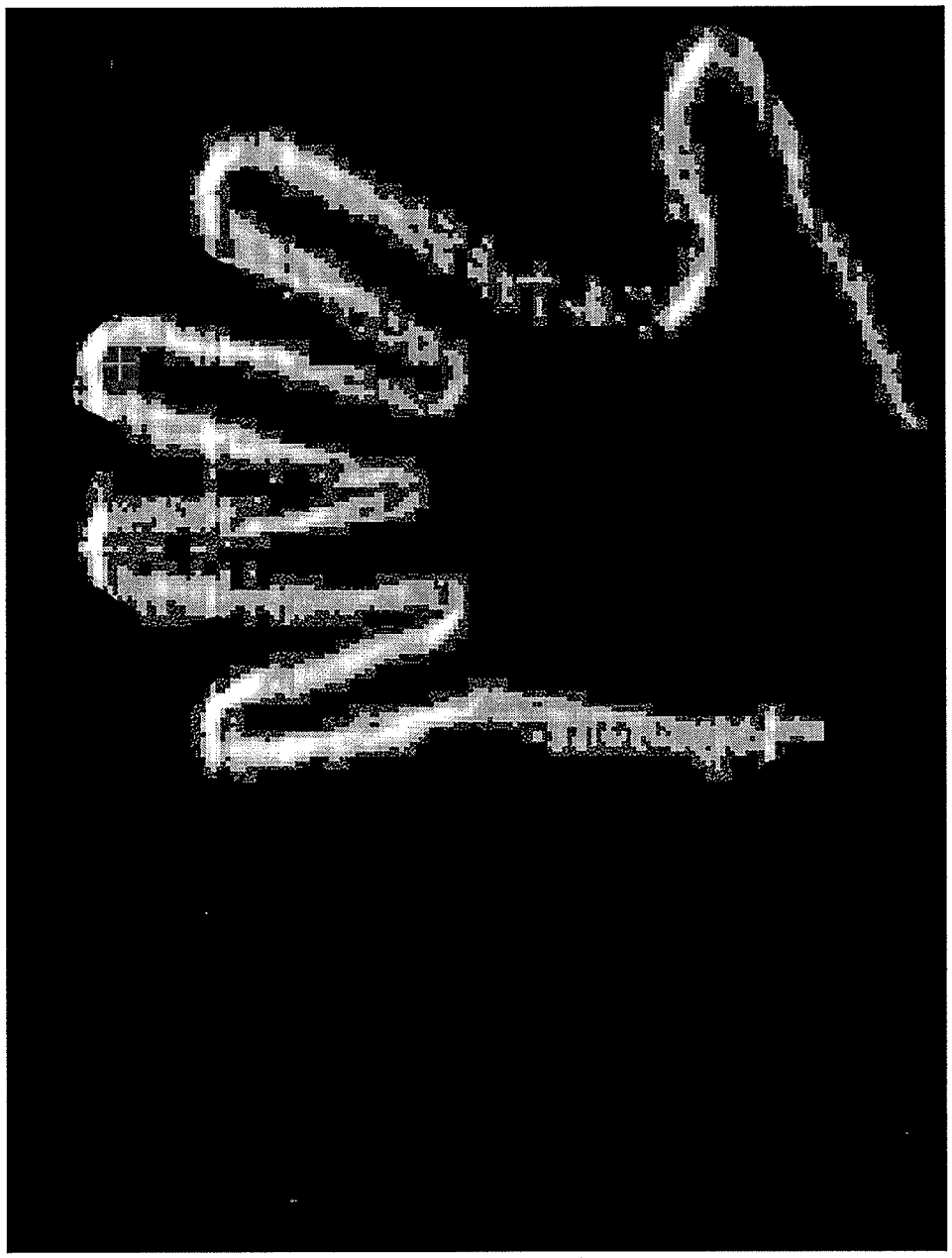
FIGS. 6 and 7 are edge images corresponding to the received images of FIGS. 4 and 5.
Figure 7:

In order to illustrate the principle of determining the z-location of a pointer 15 in the pointer input region 18 based on edge sharpness, FIGS. 2 through 5 are provided containing photographs of received images like those received by imaging system 16. It can be seen in FIG. 2 that a pointer 15, having a z-location with respect to the touch surface 14 of approximately 6 centimetres, is distinguishable by the human eye as a hand. The images shown in FIGS. 3 and 4 are of the same hand closer to the imaging system 16 and therefore the touch surface 14, having respective approximate z-locations of 2 centimetres and 1 centimetre. The image shown in FIG. 5 is of the hand with portions of the hand at a z-location of zero centimetres (i.e. parts of the hand are touching the touch surface 14). It can be seen from the images shown in FIGS. 2 through 5 that the edges of the hand increase in sharpness as the hand approaches the touch surface 14. In other words, the boundaries become clearer, or less vague. This is illustrated even more clearly in the edge images shown in FIGS. 6 and 7 that correspond to the received images in FIGS. 4 and 5, respectively. Therefore, according to the present disclosure this increase in edge sharpness can be used to detect a pointer 15 (whether it be a hand or some other object) coming towards and into contact with the touch surface 14 using image processing and without recourse to a separate contact detection mechanism such as a dedicated touch switch or other such mechanism. Furthermore, using image processing as will be described, varying levels of edge sharpness can be used to determine not only whether the pointer 15 is touching the touch surface 14, but at what distance, or z-location, the pointer 15 is relative to the touch surface 14. The pointer input region 18 therefore can be extended to form a three dimensional pointer input region 18 bounded on one side by, and extended outwards from, touch surface 14. Various application programs can be made capable of supporting additional degrees of user input such as pointer hovering, and to track approach and retraction, and similar events as will be described.

Figure 8:
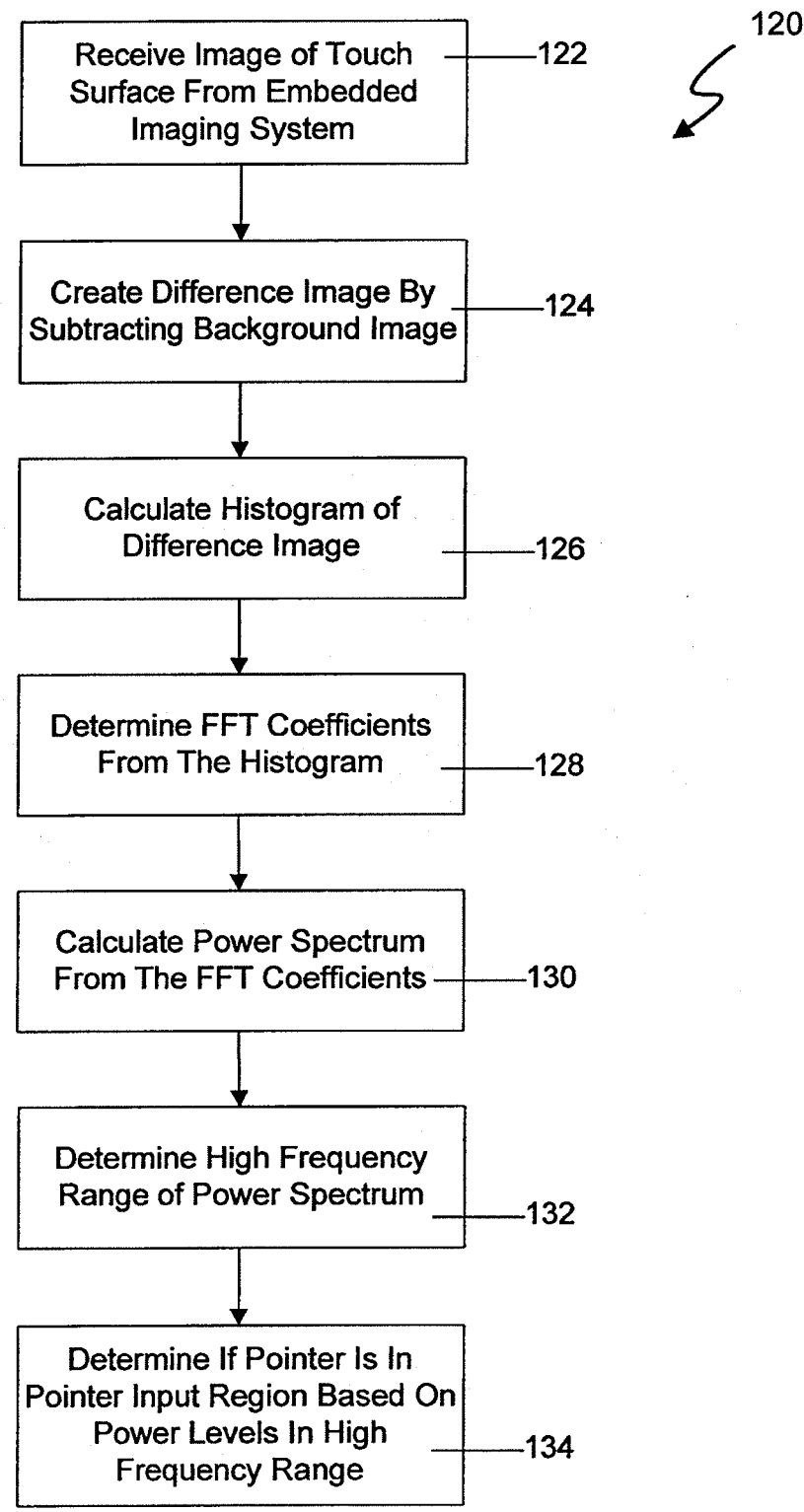
FIG. 8 is a flowchart showing steps performed during image processing to determine from an received image whether a pointer is within the pointer input region of the interactive input system of FIG. 1.

FIG. 8 is a flowchart 120 showing the image processing steps performed when an image is received from the imaging system 16 (step 122) to determine from the received image whether a pointer 15 is in the pointer input region 18, and what its z-location is. During image processing, the background image generated during calibration is retrieved and subtracted from the received image in order to remove from the received image the pixel intensities attributable to the background image (step 124). The processing structure 20 thereby creates a difference image including only the features in the received image that are not attributable to the features present in the background image. It will be understood that, due to variations in the levels of ambient light due to changes in lighting levels or the presence of objects in the general vicinity of the touch screen 12, even with no pointer 15 in the pointer input region 18 the difference image may have pixels with non-zero intensities.

An image histogram of the difference image is then created so as to plot the number of pixels in the difference image against particular pixel intensity values (step 126). A histogram $H_f$ for a digital image f that has a resolution of M by N pixels is the frequency of occurrence of each gray level l in f. As such, $H_f$ is a one-dimensional function with domain $\{0, 1, 2, \ldots L\}$, where L is the total number of pixels (M×N) in the image. The histogram is represented as in Equation 1, below:

$$H_f(l) = J \quad (1)$$

where:
J is the number of pixels at gray level l.

Using the image histogram, Fast Fourier Transform (FFT) coefficients are calculated (step 128) and the power spectrum of the histogram is calculated (step 130) as in Equation 2, below:

$$X(k) = \sum_{j=1}^{L} H_f(j) \omega_L^{(j-1)(k-1)} \quad (2)$$

where:

$$\omega_L = e^{(-2\pi i/L)}.$$

In the event that there is no substantial high frequency content in the power spectrum, there is no pointer in the pointer input region either hovering or touching the touch surface. If there is substantial high frequency content, as there can be several peaks in the high frequency range, the high frequency content is analyzed to determine the number of peaks, the steepness of peaks, the distribution of peaks, statistical analysis results and so forth (step 132). For example, a high frequency range is selected, and then the average of the power spectrum and its standard deviation in this range is calculated. The closer the pointer is to the touch surface 14, the greater the average and its standard deviation of power spectrum will appear. This is done in order to determine the overall high frequency content of a received image thereby to, on a global level, ascertain the touch status.

Figure 9:
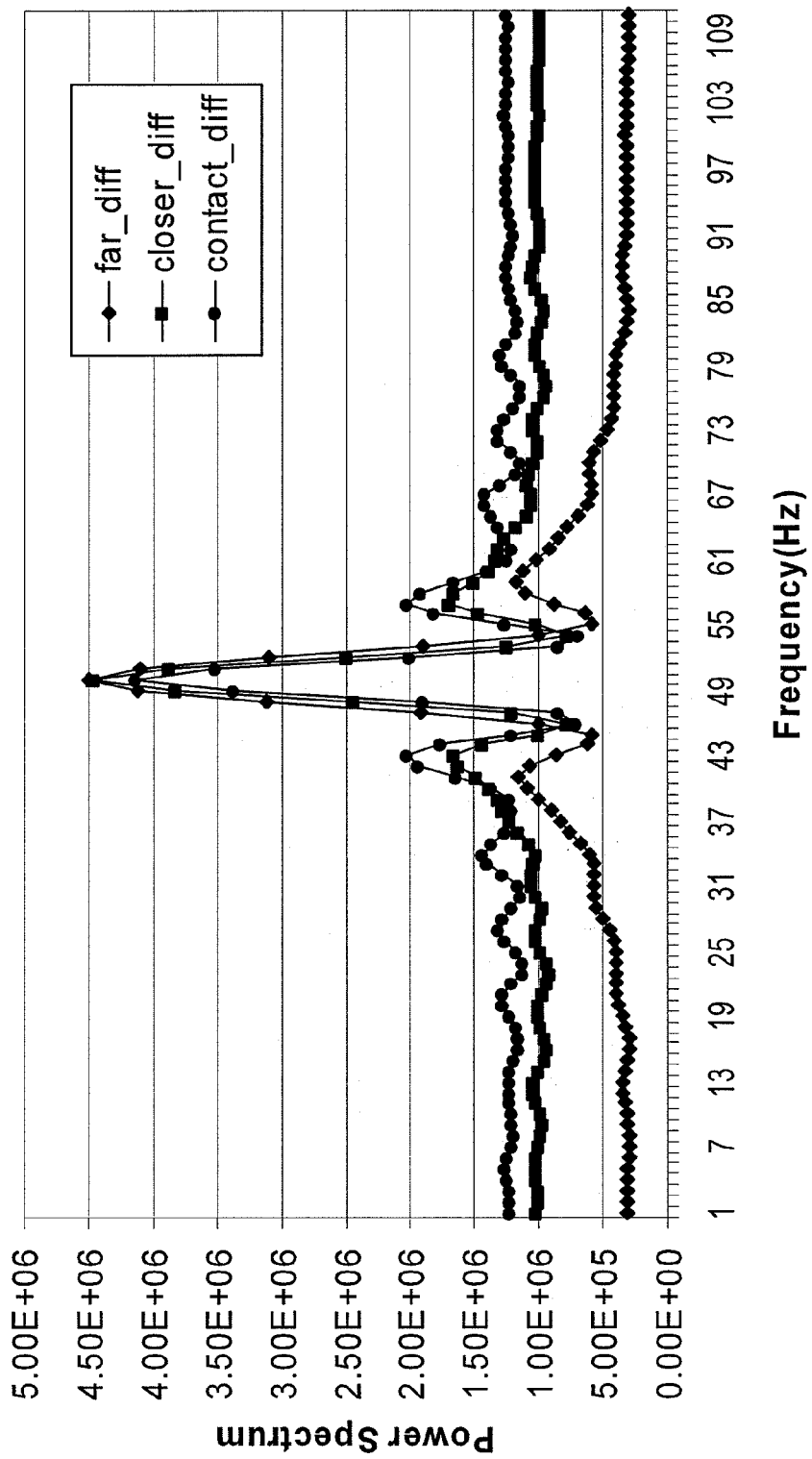
FIG. 9 is a power spectrum representing the frequency content of an image received by the interactive input system of FIG. 1.

FIG. 9 is a diagram of power spectra generated from histograms of difference images corresponding to the received images shown in FIGS. 3, 4 and 5. It is shown that the curve representing the difference image that corresponds to FIG. 3, where, of the images in FIGS. 3 to 5, the hand is farthest away from the touch surface 14, indicates the lowest of the powers in the high frequency range, whereas the curve representing the difference image where the hand is touching the touch surface 14 (FIG. 5) indicates the highest of the powers in the high frequency range. It will be noted that the curve representing the difference image where the hand is touching the touch surface 14 is also the steepest curve at its peak. As the high frequency components represent the edge content in the respective difference images, the higher the power in the high frequency components, the sharper the edges in the received image and, by inference, the closer the pointer is to the touch surface 14. It can therefore be seen that the high frequency components of the power spectrum can be used to determine the closeness, or more particularly the z-location, of a pointer 15 relative to the touch surface 14.

The power level of the high frequency range of the power spectrum for the received image is then compared to the power level of the high frequency range of the power spectrum for the calibration touch image (step 134) in order to determine the z-location of the pointer 15 relative to the touch surface 14. A threshold range or ranges can be determined from an average of the power level in high frequency range. For example, with reference to FIG. 9, the average power level in a received image having a pointer that touches the touch surface is 1.25E6. If it were established that variable X represented the average power level 1.25E6, then according to FIG. 9 it would be the case that average power level in a received image for a situation in which a pointer is far from the touch surface 14 would be approximately 0.3×. Based on this, a range could be established such that were a power level for a received image to be in the range of 0.3× to 0.95×, it would be considered the case that the pointer was within the pointer input region, but not in contact with the touch surface 14. More particularly, the pointer would be considered to have a non-zero position and therefore be at a hover distance from the touch surface 14. Similarly, were a power level for a received image to be above 0.95×, it would be considered the case that the pointer was contacting the touch surface 14.

In another implementation, the ranges might be established such that from 0.1× to 0.99× the pointer would be considered to be in the pointer input region but not touching the touch surface 14, whereas above 0.99× the pointer would be considered to be touching the touch surface 14.

In the event that the high frequency power levels from the calibration and received images are outside of a threshold range of each other the received images are not considered to include a pointer 15 within the pointer input region 18, and the received image is discarded. Otherwise, in the event that the high frequency power levels from the received images are within a threshold range of the calibration image, the received image is considered to include a pointer 15 within the pointer input region 18. In this event, the difference in the power levels represent the z-distance of the pointer 15 from the touch surface 14 such that if the high frequency power levels from the calibration and received images are within a smaller subrange of each other (i.e. substantially the same power), the pointer 15 is considered to have a zero z-location and therefore be touching the touch surface 14. Otherwise, the pointer 15 is considered to be hovering at some non-zero z-location from the touch surface 14 but within the pointer input region 18.

Once it is determined that the z location is zero or non-zero (and perhaps what the non-zero z-location is), further image processing can be undertaken in order to determine the x-y location of the pointer 15 within the pointer input region 18, in a known manner. It will be understood that, in the event that an application program is not capable of being responsive to hover events, further processing to determine the x-y location will not be required once the z-location of the pointer 15 has been determined to be non-zero because, from the point of view of the application program, it will be as though no pointer 15 has been detected.

A host application running on the processing structure 20 tracks each pointer 15 in the pointer input region and handles continuity processing between the frames. More particularly, the host application receives pointer data and based on the pointer data determines whether to register a new pointer 15, modify an existing pointer 15, or cancel/delete an existing pointer 15. Thus, the host application registers a New Pointer event representing a new pointer 15 when it receives pointer data that is not related to an existing pointer 15, and accords the new pointer 15 a unique identifier. Pointer data may be considered unrelated to an existing pointer 15 if it characterizes a pointer 15 that is a threshold x-y distance away from an existing pointer 15, for example. The host application registers a Pointer Move event representing movement of the pointer 15 when it receives pointer data that is related to an existing pointer 15, for example by being within a threshold x-y distance of, or overlapping an existing pointer 15 (whether touching touch surface 14 or not), but having a different x-y location. The host application registers a Pointer Up event representing moving of a pointer 15 in the z-direction from a touching location to a non-touching location within the pointer input region 18 when pointer data that can be associated with an existing pointer 15 touching the touch surface 14 has lower edge sharpness than would a pointer 15 in a touch location. The host application registers a Pointer Down event representing moving of a pointer 15 in the z-direction from a non-touching location to a touching location within the pointer input region 18 when pointer data that can be associated with an existing pointer 15 touching the touch surface 14 has an edge sharpness that represents a zero z-location or a z-location within a threshold distance of zero. The host application registers a Pointer Out event representing moving of a pointer 15 out of the pointer input region 18 in a z-direction when pointer data that can be associated with an existing pointer ceases to be received from subsequent images, or has an edge sharpness that represents a z-location that is outside of the pointer input region 18.

The host application also tracks the relative levels of sharpness of a pointer 15 between frames so as to not only track the x-y location of the pointer 15 but also the z location to determine whether the pointer 15 is approaching or retracting from the touch surface 14. The host application may then use this information in order to extrapolate the x, y and z paths of pointer travel, and thereby determine where a pointer 15 approaching the touch surface 14 is likely to meet the touch surface 14. The host application may then register a Pointer Down event and pass it to a particular object at the calculated point of convergence on the desktop prior to the pointer 15 actually having touched the touch surface 14, thereby intelligently selecting the object and easing the usability of the interactive input system 10. A similar use may be made of data indicating the retraction of the pointer 15 from the touch surface 14 to register a Pointer Out event without the user actually having had to pull the pointer 15 completely out of the pointer input region 18.

The New Pointer, Pointer Move, Pointer Down, Pointer Up, and Pointer Out events are passed to respective elements of the user interface such as graphical objects, widgets, or the background/canvas, based on the element with which the pointer is currently associated, and/or the pointer's current location.

The above-described method for determining touch status provides a global touch status and z-position of a pointer. However, the high frequency content in the image may be the result of multiple pointers close to or in contact with the touch surface, as would be the case in a multi-touch system. In a multi-touch scenario, the local touch status based on local sharpness of boundaries of objects captured in an image frame is required. This may be done by tracking individual objects in the received images by segmenting and performing the above-described method for each individual object.

Figure 10:
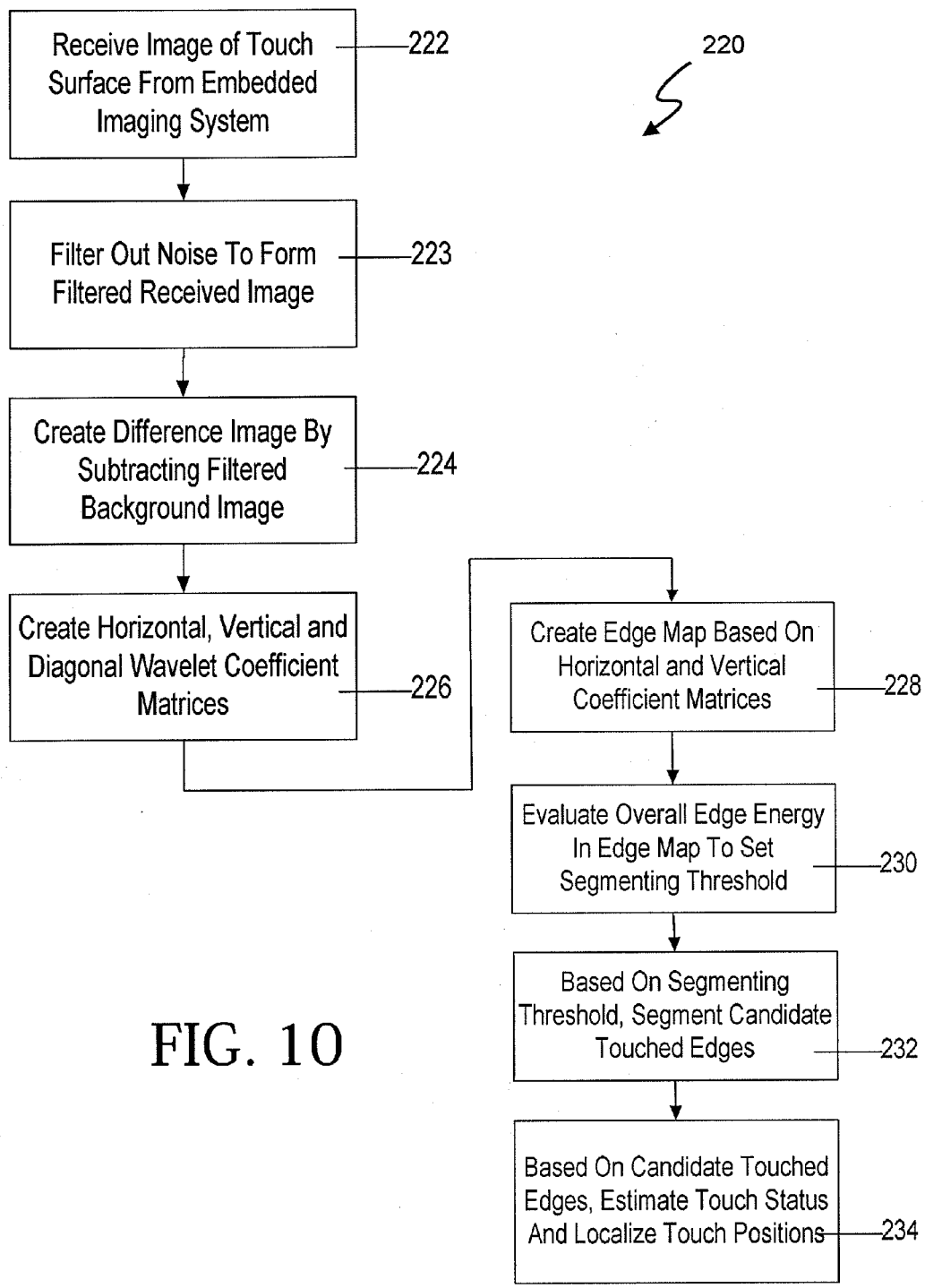
FIG. 10 is a flowchart showing steps in an alternative method performed during image processing to determine whether a point is within the pointer input region.

FIG. 10 is a flowchart 220 showing an alternative method during which image processing steps are performed when an received image is received from the imaging system 16 (step 222) to determine from the received image whether a pointer 15 is in the pointer input region 18, and what its z-location is. During image processing, the received image is filtered, in this embodiment using a Gaussian filter, to remove noise (step 223). The background image generated during calibration is retrieved, filtered using the same Gaussian filter, and subtracted from the filtered received image in order to remove from the filtered received image the pixel intensities attributable to the filtered background image (step 224). The processing structure 20 thereby creates a difference image Iφ including only the features in the received image that are not attributable to the features present in the background image. It will be understood that, due to variations in the levels of ambient light due to changes in lighting levels or the presence of objects in the general vicinity of the touch screen 12, even with no pointer 15 in the pointer input region 18 the resulting difference image Iφ may have pixels with non-zero intensities.

The difference image Iφ having a size of M×N pixels, is then processed to create horizontal, vertical and diagonal wavelet coefficient matrices (step 226). During creation of the wavelet coefficient matrices, a Discrete Wavelet Transform (DWT) with Haar basis function is applied to the difference image Iφ in order to calculate coefficients Wφ that define an approximation of the difference image Iφ at an arbitrary starting scale $j_0$, as in Equation 3 below:

$$W_\phi(j_0, m, n) = \frac{1}{\sqrt{MN}} \sum_{x=0}^{M-1} \sum_{y=0}^{N-1} I\varphi_{j_0}, m, n \qquad (3)$$

where:

m, n are integers representing the location relating to difference image I$\phi$.

Figure 11:
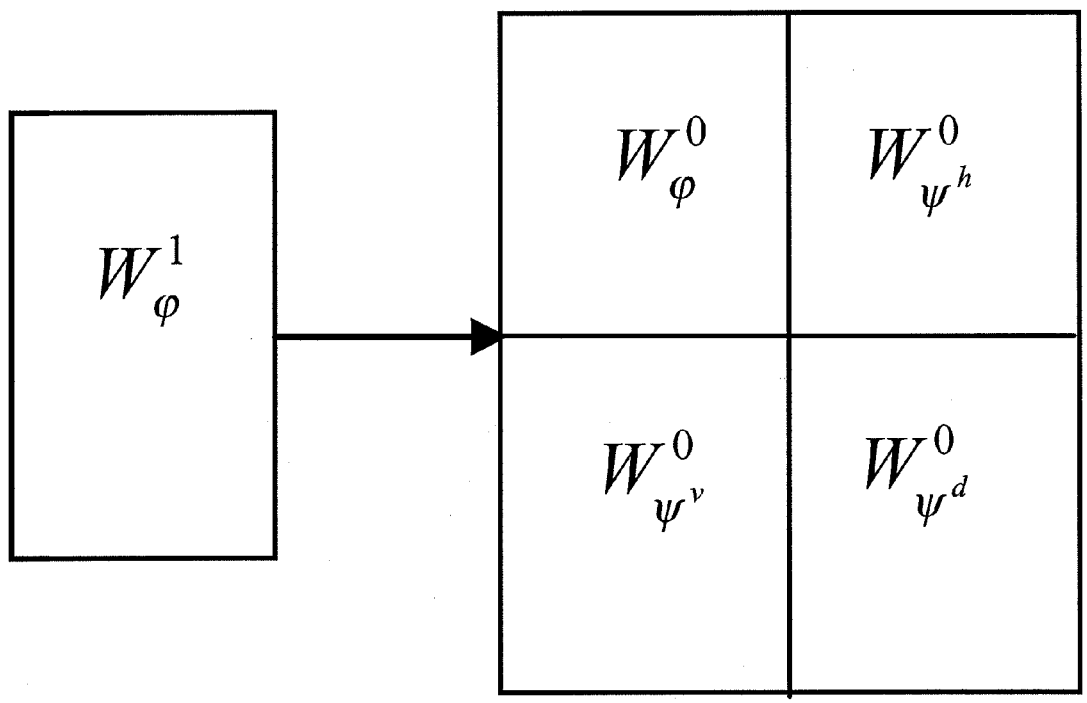
FIG. 11 is a schematic diagram illustrating wavelet decomposition.

Horizontal, vertical and diagonal details are represented by coefficients W$\psi$ for scale $j \geq j_0$ as illustrated in FIG. 11 according to Equation 4 below:

$$W_\psi(j, m, n) = \frac{1}{\sqrt{MN}} \sum_{x=0}^{M-1} \sum_{y=0}^{N-1} I\psi_j^i, m, n \quad (4)$$

In FIG. 11, $W_\phi^0$ is an approximation of difference image I$\phi$ by a two-dimensional lowpass filter (Lo-Lo); $W_{\psi^h}^0$ is horizontal details of coefficients by horizontal highpass and vertical lowpass filters (Hi-Lo); $W_{\psi^v}^0$ is vertical details of coefficients by horizontal lowpass and vertical highpass filters (Lo-Hi); and $W_{\psi^d}^0$ is diagonal details of coefficients by 2-D highpass filter (Hi-Hi).

The scaling function $\phi_{j,m,n}$ and translated basis function $\psi_{j,m,n}^i$ are defined as in Equations 5 and 6 below:

$$\phi_{j,m,n}(x,y) = 2^{j/2} \phi(2^j x - m, 2^j y - n) \quad (5)$$

$$\psi_{j,m,n}^i(x,y) = 2^{j/2} \psi(2^j x - m, 2^j y - n) \quad (6)$$

As described in the publication entitled "Wavelets For Computer Graphics: Theory And Applications", Eric J. Stollnitz, Tony D. DeRose, David H. Salesin ISBN 1-55860-375, 1996, a standard construction of two-dimensional wavelet basis is the result of all possible tensor products of one-dimensional basis functions. The one-dimensional Haar basis scaling function $\phi(x)$ and one-dimensional Haar translated basis function $\Psi(x)$ are shown respectively in Equations 7 and 8 below:

$$\varphi(x) = \begin{cases} 1 & \text{for } 0 \leq x < 1; \\ 0 & \text{otherwise} \end{cases} \quad (7)$$

$$\varphi(x) = \begin{cases} 1 & \text{for } 0 \leq x < 1; \\ 0 & \text{otherwise} \end{cases} \quad (8)$$

During testing, the MatLab™ Wavelet Toolbox was used to implement the two-dimensional Haar Wavelet Transform.

With the coefficient matrices having been created as described above, an edge map M is then created based on the horizontal $W_{\psi^h}^0(h)$ and vertical coefficient matrices $W_{\psi^v}^0(v)$ (step 228), as shown in Equation 9 below:

$$M(m,n) = sqrt(h^2 + v^2) \quad (9)$$

The diagonal coefficient matrix has been found to produce little edge detail generally, and thus in this embodiment the diagonal coefficient matrix is not used for creating the edge map M.

An edge energy evaluation of the edge map M is then conducted to determine the edge energy level in the edge map M. Each point in the edge map corresponds to a pixel location in the different image I$\phi$. It will be understood that the greater the edge energy level, the sharper the edges and accordingly the closer the pointer to the touch surface. Based on experiments or a calibration procedure for an implementation, an energy threshold level is established for use in segmenting the edges to determine which, if any, of the edges are candidate touched edges (step 230). For example, a pointer can be moved gradually closer to the touch surface 14 until it is touched and at respective distances the edge maps can be analyzed. An energy threshold level can be established as the value that, due to pointer being very close to the surface i.e., less than 5 mm, the segmented edge map almost becomes black. Similarly, when the pointer just touches the surface the segmented edge map becomes white at the edge areas. In order to establish a stable energy threshold level, this procedure is advantageously performed under various ambient lighting conditions and using various pointers.

Based on the established energy threshold level, candidate touched edges are segmented such that candidate touched edges being above the threshold are turned white and all else is turned black so that it can be established that every white is a touch area and therefore can be clearly distinguished from the other edges in the edge map M (step 232). More particularly, those edges in the edge map M that have a local energy level at or above the threshold level are considered candidate touch edges. The candidate touch edges are then processed to estimate the touch status (touch or hover) and to determine the local touch (x,y) positions (step 234).

During testing of the above-described method, images having different touch status (far from touching, close to touching, and touching) of a pointer, in this case a user's hand, were processed under different ambient lighting conditions.

Figure 12:
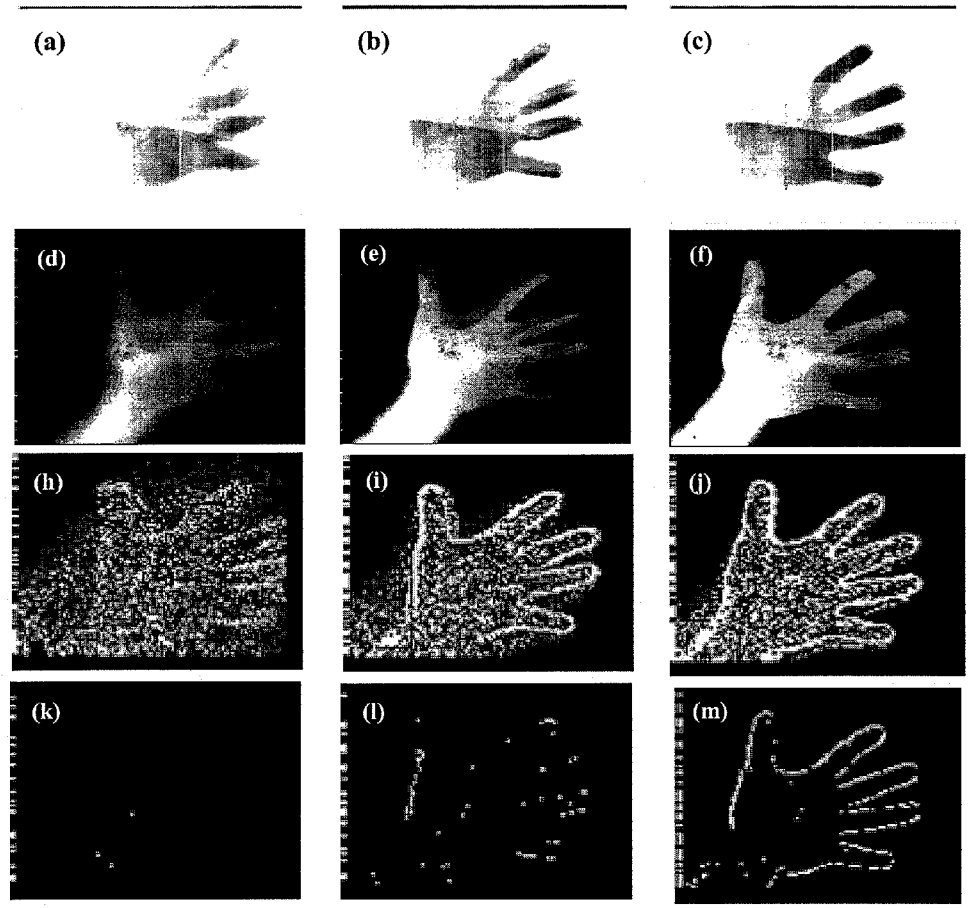
FIG. 12 shows several images including received test images and results of processing at different stages of the method of FIG. 10 for a first ambient lighting condition.

FIG. 12 shows, for a first ambient lighting condition, several images (a) to (m) including received test images and the results of processing at different stages of the above-described method, as organized in Table 1 below:

TABLE 1

|  | FAR | CLOSE | TOUCHING |
|---|---|---|---|
| RECEIVED IMAGE | 12(a) | 12(b) | 12(c) |
| DIFFERENCE IMAGE | 12(d) | 12(e) | 12(f) |
| EDGE MAP IMAGE | 12(h) | 12(i) | 12(j) |
| SEGMENTED EDGE LOCATION IMAGE | 12(k) | 12(l) | 12(m) |

Figure 13:
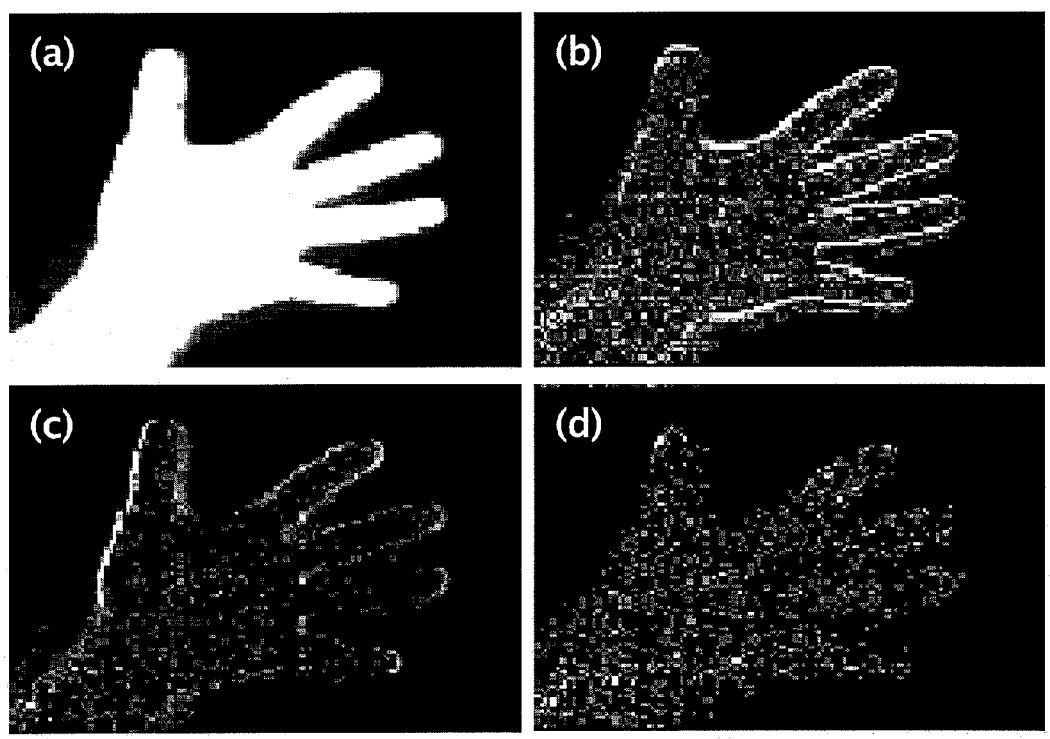
FIG. 13 shows several images representing wavelet transform coefficients used to form an edge map.

Images (a) to (c) are the received images where the hand is far, close and touching, respectively. Images (d) to (f) are difference images obtained by subtracting a filtered background image from filtered images (a) to (c). Images (h) to (j) are edge map images corresponding to difference images (d) to (f), and were created from the Haar Wavelet Transform coefficients calculated according to Equations 3 and 4 as described above. For example, the edge map image (j) is the result of the application of Equation 9 to the vertical and horizontal coefficient matrices shown in FIG. 13. FIG. 13 shows each of the approximation, horizontal, vertical and diagonal Haar Wavelet Transform coefficient details.

Images (k) to (m) are images corresponding to edge map images (h) to (j) with the touch edge locations having been segmented as described above. The white areas are candidate touch positions. It can be seen when comparing images (k) through (m), that when the hand touches the touch surface (see image (m)), the edge map shows strong edges, whereas when the hand progresses farther away (see images (l) and then (k)) from the touch surface, the edges represented by the edge map weaken. It can be seen in edge map image (l) that there is very little white area.

Figure 14:
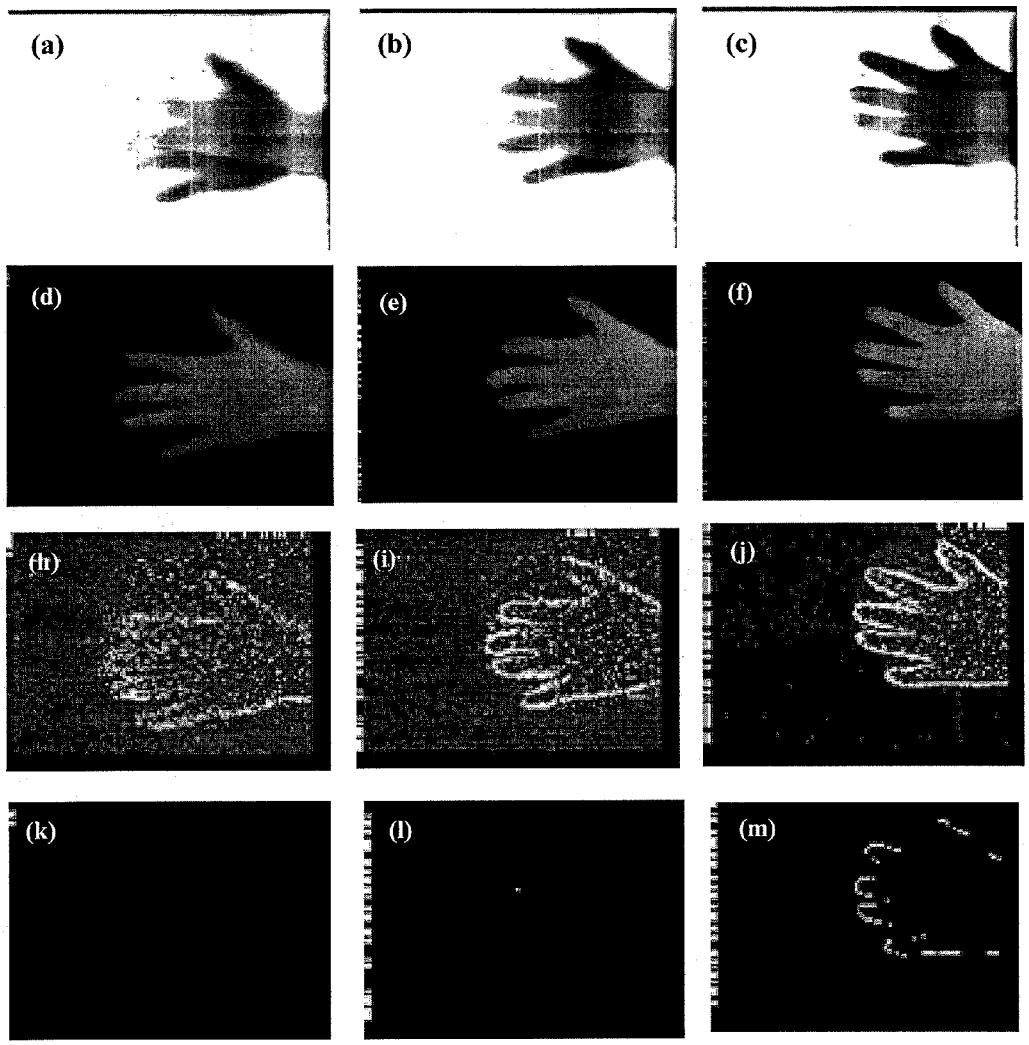
FIG. 14 shows several images including received test images and results of processing at different stages of the method of FIG. 10 for a second ambient lighting condition.

FIG. 14 shows, for a second, darker ambient lighting condition and a different pointer, several images (a) to (m) including received test images and the results of processing at different stages of the above-described method, as organized in Table 2 below:

TABLE 2

|  | FAR | CLOSE | TOUCHING |
| --- | --- | --- | --- |
| RECEIVED IMAGE | 14(a) | 14(b) | 14(c) |
| DIFFERENCE IMAGE | 14(d) | 14(e) | 14(f) |
| EDGE MAP IMAGE | 14(h) | 14(i) | 14(j) |
| SEGMENTED EDGE LOCATION IMAGE | 14(k) | 14(l) | 14(m) |

It was found that, even though there was darker ambient lighting in the second test, similar results were obtained from edge map segmentation in that the far, close and touching pointer statuses could be readily distinguished from each other. Thus, the method described above employing segmentation based on the Haar Wavelet Transform was found to be robust through different ambient lighting conditions.

An alternative method of determining the z-location or touch status of a pointer in an interactive input system is based on pointer shadow activity observed in captured images of the touch surface. Detection of shadow pointer shadow activity was found to be heavily dependent on ambient lighting conditions. As such, different configurations of auxiliary lighting were considered. FIG. 15 shows three different auxiliary lighting configurations that were considered for controlling the lighting such that pointer shadow activity detection in images taken of the touch surface was less dependent upon ambient lighting conditions.

Figure 15A:
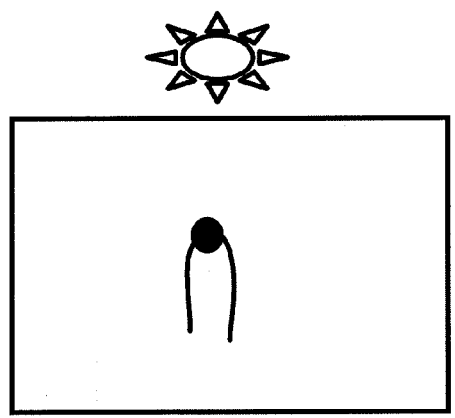
FIG. 15 shows three different auxiliary lighting conditions for controlling lighting for detection of pointer shadow interaction.
Figure 15B:
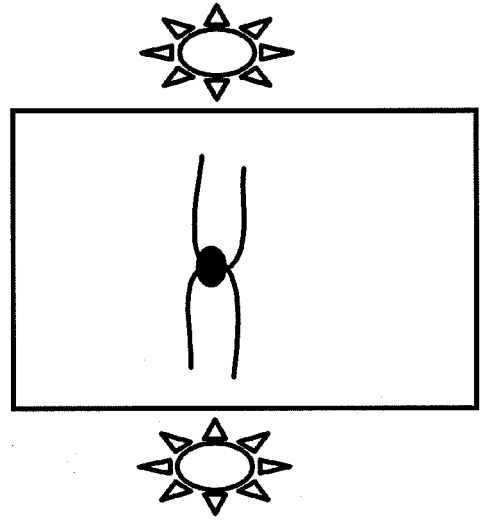
Figure 15C:
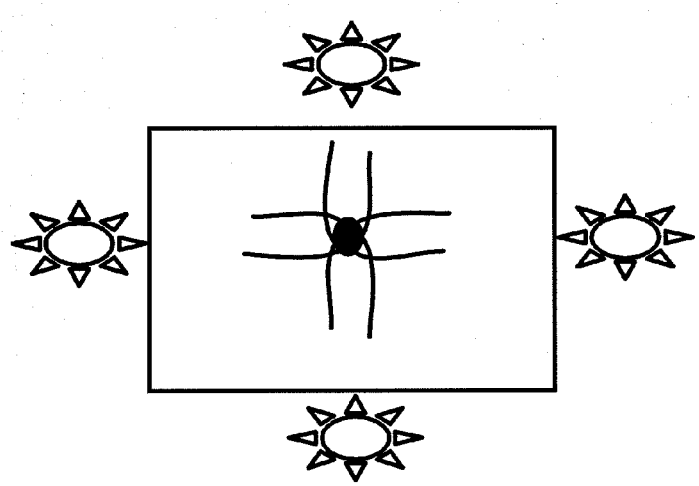

In FIG. 15(a), a single auxiliary light positioned towards the top of the touch surface was found in captured images to cause a single prominent shadow for each pointer that was proximate the touch surface. Where the pointer made contact with the touch surface, a relatively dark spot appeared in the captured images at the top of the single prominent shadow. In FIG. 15(b), two auxiliary lights were provided, with one positioned towards the top of the touch surface and the other positioned towards the bottom of the touch surface. Two shadows of the pointer were evident in captured images of the touch surface where the pointer was proximate the touch surface. The shadows were found to intersect at the position at which the pointer was brought into contact with the touch surface, with a relatively dark spot at the shadows' intersection point. A similar effect was observed in images captured of the touch surface where there were four auxiliary lights as shown in FIG. 15(c), whereby four shadows were observed for a proximate pointer that intersected at the position at which the pointer was brought into contact with the touch surface, with a relatively dark spot at the shadows' intersection point.

Figure 16:
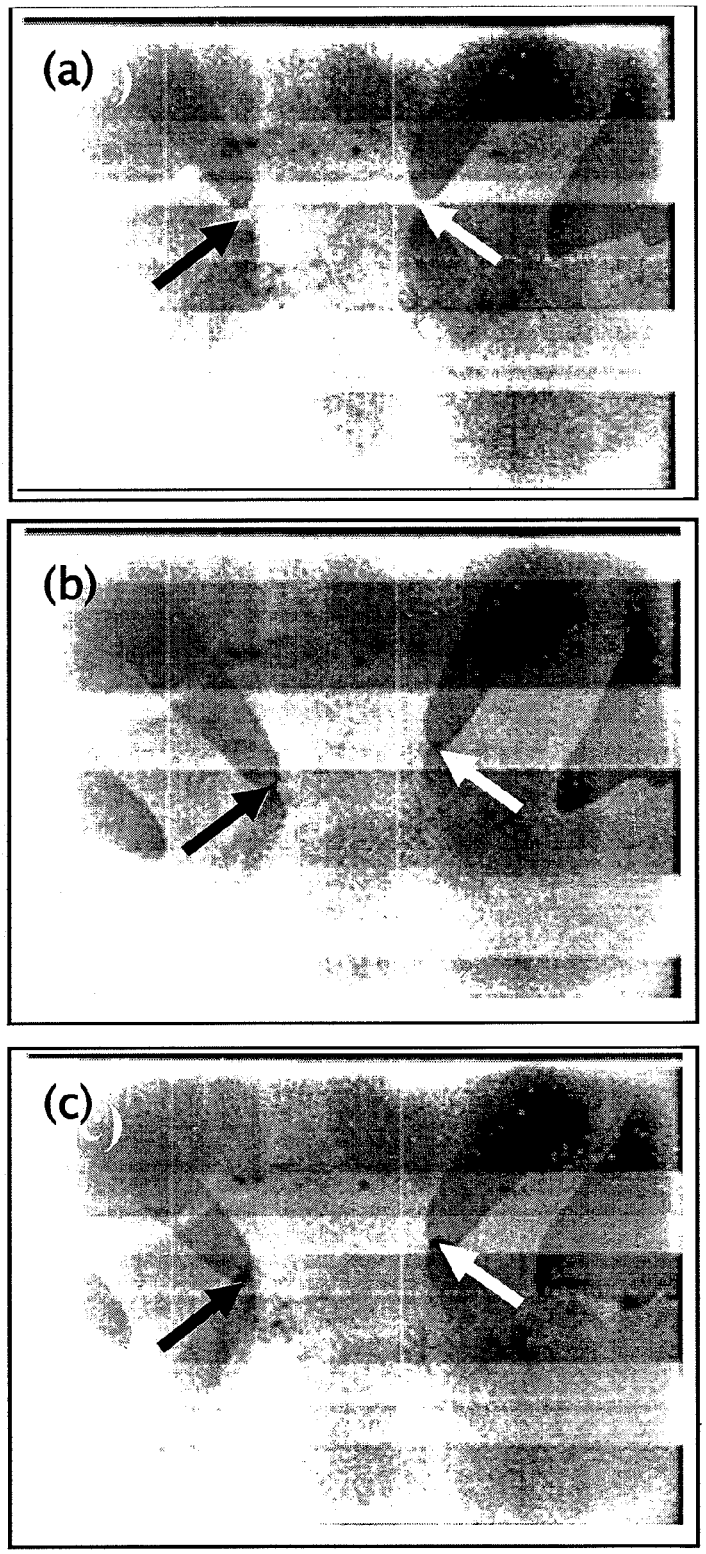
FIG. 16 shows test images received with shadows of pointers at various positions within the pointer input region.

Test images for the configuration shown in FIG. 15(b), whereby two auxiliary lights were used, are shown in FIG. 16. FIG. 16(a) is an image captured of the touch surface when two fingers were proximate the touch surface but not in contact with the touch surface. The shadows created by the two fingers were clearly discernable in the images, but did not intersect. FIG. 16(b) is an image captured of the touch surface while the tips of the two fingers had first made contact with the touch surface. It can be seen in FIG. 16(b) that shadows of the fingers intersected and, at the intersection points of the shadows, there were dark spots. FIG. 16(c) is an image captured of the touch surface while the tips of the two fingers were being pressed more firmly against the touch surface. It can be seen in FIG. 16(c) that shadows of the fingers remained intersected and, at the intersection points of the shadows, the dark spots were larger than in FIG. 16(b).

Figure 17:
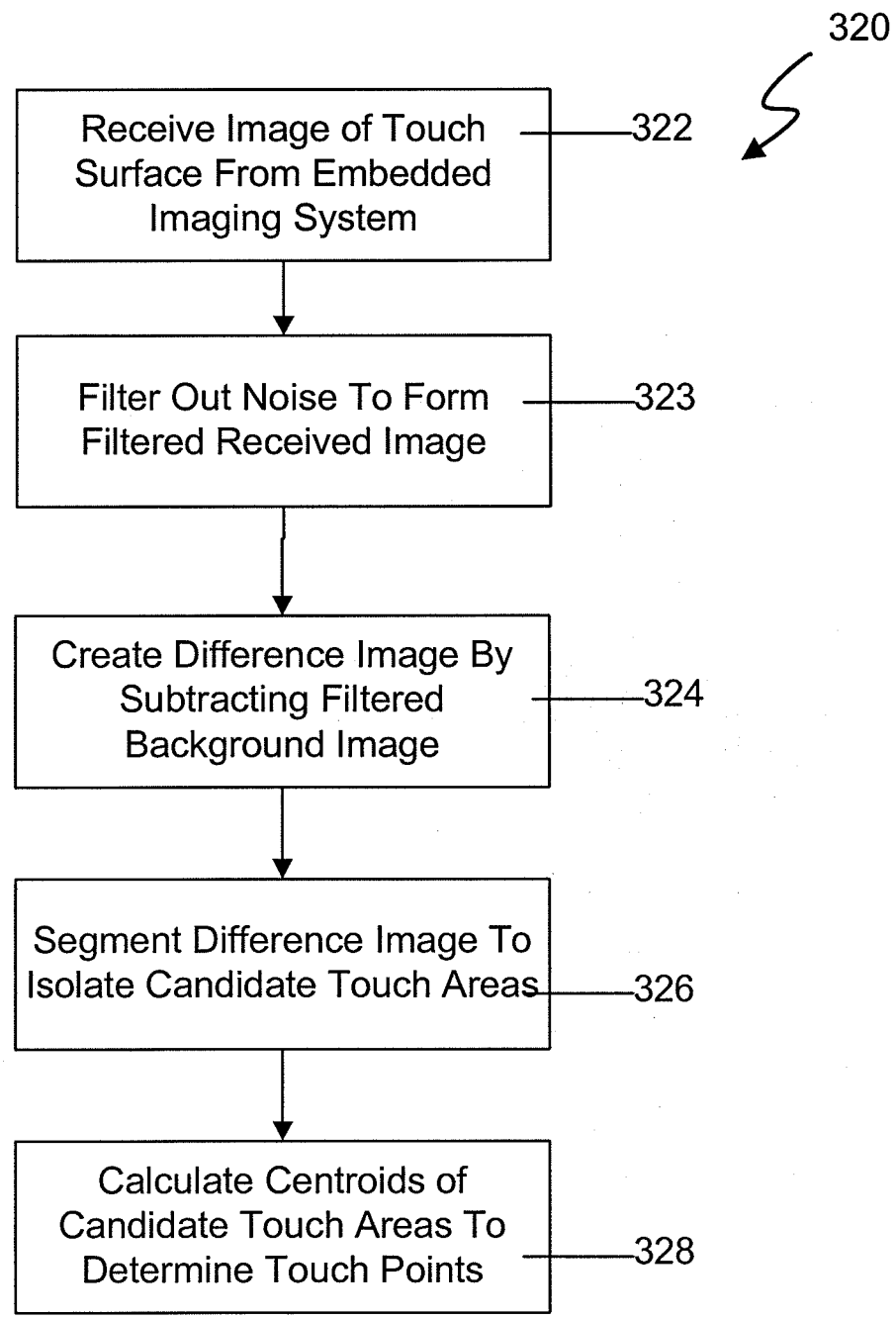
FIG. 17 is a flowchart showing an alternative method during which image processing steps are performed to determine from a received image whether a pointer or pointers is/are touching the touch surface based on pointer shadow interaction.
Figure 18:
FIG. 18 shows a background image, a received image and a segmented difference image as a result of the method of FIG. 17.

FIG. 17 is a flowchart 320 showing an alternative method during which image processing steps are performed when an received image is received from the imaging system 16 (step 322) to determine from the received image whether a pointer or pointers 15 is/are touching the touch surface based on pointer shadow interactions. During image processing, the received image is filtered, in this embodiment using a Gaussian filter, to remove noise (step 323). FIG. 18(b) shows a received image in which it can be seen that five pointers, in this case fingers of a hand, have contacted the touch surface. The lighting at the bottom of the received image caused saturation of the image. As a result, there is only one shadow corresponding to the leftmost finger. The background image generated during calibration (see FIG. 18(a)) is retrieved, similarly filtered, and subtracted from the filtered received image in order to remove from the filtered received image the pixel intensities attributable to the filtered background image (step 324). The processing structure 20 thereby creates a difference image I including only the features in the received image that are not attributable to the features present in the background image. A threshold intensity level is then determine for the difference image I in order to segment the difference image I thereby to isolate candidate touch areas (step 326). An image resulting from the segmentation is shown in FIG. 18(c). The segmented image is then processed to calculate the centroids of the candidate touch areas thereby to determine the touch point coordinates (step 328), if any.

It will be understood that alternatives to the above-described embodiments and examples may be contemplated. For example, in embodiments disclosed, two pointer states—touch and hover—were established by processing the average power levels of received images to determine in which of two ranges the power levels fell. According to an alternative embodiment, the hover pointer state may itself be divided into multiple zones that are established based on edge sharpness of the pointer as determined from the average power levels of received images in a similar manner to that which has been described. In one example, a first range 0.1× to 0.5×, representing a first range of distances of a pointer from the touch surface 14, would be interpreted by the processing structure as a gesture zone. With a pointer in the gesture zone, movements of the pointer would be processed as gestures to open or close an application menu, or some other function. In this example, a second range 0.5× to 0.95×, representing a second range of distances of a pointer from the touch surface, would be interpreted by the processing structure as a hover zone. With a pointer in the hover zone, movements of the pointer would be processed as cursor control similar to the manner in which computer mouse movement is interpreted. Above 0.95× the pointer would be considered to be touching the touch surface 14.

The method and system described above for determining the location of a pointer in a pointer input region may be embodied in one or more software applications comprising computer executable instructions executed by the processing structure 20. The software application(s) may comprise program modules including routines, programs, object components, data structures etc. and may be embodied as computer readable program code stored on a computer readable medium. The computer readable medium is any data storage device that can store data, which can thereafter be read by a processing structure 20. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described, those of skill in the art will appreciate that variations and modifications may be made without departing from the spirit and scope thereof as defined by the appended claims.

What is claimed is:

1. An interactive input system comprising:
   a touch surface;
   an imaging system associated with the touch surface and comprising an optical sensor array that spans at least a portion of the area of the touch surface; and
   processing structure communicating with the imaging system and processing images received by the imaging system to determine whether at least one pointer is near to the touch surface and a distance of the at least one pointer from the touch surface based at least in part on the edge sharpness of the at least one pointer.

2. The interactive input system of claim 1, wherein the optical sensor array is embedded along with display pixels in a display panel.

3. The interactive input system of claim 2, wherein the display panel is a liquid crystal display (LCD).

4. The interactive input system of claim 3, wherein the LCD is an active matrix LCD (AMLCD).

5. The interactive input system of claim 1, wherein the processing structure determines whether the at least one pointer is within an input region of the interactive input system based at least in part on the edge sharpness of the at least one pointer.

6. The interactive input system of claim 5, wherein the processing structure determines whether the at least one pointer in the input region is in contact with the touch surface.

7. The interactive input system of claim 1, wherein the processing structure determines edge sharpness of the at least one pointer by generating histograms based on the received images and analyzing high frequency content in the histograms.

8. The interactive input system of claim 7, wherein the high frequency content is analyzed in power spectrums that are generated from the histograms.

9. An interactive input system comprising:
   a pointer input region comprising a touch surface;
   an imaging system associated with the touch surface and comprising an optical sensor array that spans at least a portion of the area of the touch surface; and
   processing structure processing images received by the imaging system to determine whether at least one pointer is within the pointer input region and a distance of the at least one pointer from the touch surface within the pointer input region based at least in part on the edge sharpness of the at least one pointer.

10. A method of determining the location of at least one pointer in a pointer input region of an interactive input system comprising a touch surface, the method comprising:
    receiving images from an optical sensor array that is associated with and spans at least a portion of the area of the touch surface;
    determining whether at least one pointer is within the pointer input region; and
    in the event that at least one pointer is within the pointer input region, determining a distance of the at least one pointer from the touch surface within the pointer input region based at least in part on the edge sharpness of the at least one pointer.

11. The method of claim 10, wherein determining the distance of the pointer within the pointer input region comprises determining whether the pointer is in contact with the touch surface based at least in part on the edge sharpness of the at least one pointer.

12. The method of claim 10, further comprising tracking the at least one pointer across a sequence of received images and determining based on the tracking whether the at least one object is approaching or retracting from the touch surface.

13. The method of claim 12, wherein the at least one pointer is approaching the touch surface in the event that edge sharpness of the object is determined to be increasing across the sequence of received images.

14. The method of claim 12, wherein the at least one pointer is retracting from the touch surface in the event that edge sharpness of the object is determined to be decreasing across the sequence of received images.

15. The method of claim 10, wherein determining whether at least one pointer is within the pointer input region comprises removing background features, and determining whether substantial high frequency content remains in the image.

16. The method of claim 15, wherein in the event that no substantial high frequency content remains, determining that there is no pointer in the pointer input region.

17. The method of claim 15, comprising:
    in the event that substantial high frequency content remains, determining from the high frequency content whether a pointer has touched the touch surface or is hovering within the pointer input region above the touch surface.

18. The method of claim 10, wherein edge sharpness of the at least one pointer is determined by analyzing the high frequency content in a power spectrum based on a histogram generated from the images.

19. The method of claim 10, wherein edge sharpness of the at least one pointer is determined by analyzing the edge energy of an edge map based on a wavelet decomposition of the images.

20. A method of determining the location of at least one pointer in a pointer input region of an interactive input system comprising a touch surface, the method comprising:
    receiving an image from an optical sensor array that is associated with and spans at least a portion of the area of the touch surface; and
    determining the location of the pointer within the pointer input region based at least in part on the relative position of at least two shadows of the pointer in the image;
    wherein determining the location of the pointer within the pointer input region comprises determining whether the pointer is in contact with the touch surface by determining an intersection point between the at least two shadows, the pointer being determined not to be contact with the touch surface when there is no intersection point generated between the at least two shadows.

21. The method of claim 20, wherein the pointer is determined to be in contact with the touch surface when there is an intersection point generated between the at least two shadows of the pointer.

22. A computer readable medium having stored thereon a computer program for determining the location of at least one pointer in a pointer input region of an interactive input system comprising a touch surface, the computer program comprising computer readable instructions, which when executed by a processor causes the processor to implement the steps of:
    receiving images from an optical sensor array that is associated with and spans at least a portion of the area of the touch surface;
    determining whether at least one pointer is within the pointer input region; and
    in the event that at least one pointer is within the pointer input region, determining a distance of the at least one pointer from the touch surface within the pointer input region based at least in part on the edge sharpness of the at least one pointer.

23. A computer readable medium having stored thereon a computer program for determining the location of at least one pointer in a pointer input region of an interactive input system comprising a touch surface, the computer program comprising computer readable instructions, which when executed by a processor causes the processor to implement the steps of:

receiving an image from an optical sensor array that is associated with and spans at least a portion of the area of the touch surface; and determining the location of the pointer within the pointer input region based at least in part on the relative position of at least two shadows of the pointer in the image;

wherein determining the location of the pointer within the pointer input region comprises determining whether the pointer is in contact with the touch surface by determining an intersection point between the at least two shadows, the pointer being determined not to be contact with the touch surface when there is no intersection point generated between the at least two shadows.

24. The computer readable medium of claim 23, wherein the pointer is determined to be in contact with the touch surface when there is an intersection point generated between the at least two shadows of the pointer.

* * * * *